Jan. 28, 1941.    C. B. CAPERTON    2,230,074
TILE MANUFACTURE
Filed April 7, 1939    7 Sheets-Sheet 2

INVENTOR
Charles B. Caperton
BY
Pennie Davis Marvin + Edmonds
ATTORNEYS

Jan. 28, 1941.  C. B. CAPERTON  2,230,074
TILE MANUFACTURE
Filed April 7, 1939  7 Sheets-Sheet 3

INVENTOR
Charles B. Caperton
BY
Pennie Davis Marvin & Edmonds
ATTORNEYS

Fig. 6

Jan. 28, 1941.  C. B. CAPERTON  2,230,074
TILE MANUFACTURE
Filed April 7, 1939  7 Sheets-Sheet 5

INVENTOR
Charles B. Caperton
BY
Pennie Davis Marvin & Edmonds
ATTORNEYS

Jan. 28, 1941.  C. B. CAPERTON  2,230,074
TILE MANUFACTURE
Filed April 7, 1939  7 Sheets-Sheet 6

INVENTOR
Charles B. Caperton
BY
Pennie Davis Marvin & Edmonds
ATTORNEYS

Jan. 28, 1941.  C. B. CAPERTON  2,230,074
TILE MANUFACTURE
Filed April 7, 1939  7 Sheets-Sheet 7

INVENTOR
Charles B. Caperton
BY
Pennie Davis Marvin & Edmonds
ATTORNEYS

Patented Jan. 28, 1941

2,230,074

UNITED STATES PATENT OFFICE 2,230,074

TILE MANUFACTURE

Charles B. Caperton, Wallingford, Pa., assignor to Riegel Textile Corporation, New York, N. Y., a corporation of New York Application April 7, 1939, Serial No. 266,596

12 Claims. (Cl. 25—42)

This invention relates to machines for making tiles, composition boards, and similar articles, by forming a plastic material into articles of the desired shape in a continuous operation. More particularly, the invention is concerned with a novel machine for this purpose which is adapted to operate on a wide variety of materials, including light sticky materials which are difficult to handle, and which is reliable and efficient in operation.

In the manufacture of tiles, composition boards, etc., from plastic materials, it is common to feed the material in a soft state to an endless belt or conveyor where it is formed into articles of the required shape. If the material is one which in its initial state cannot retain its form, the conveyor is provided with side walls to prevent the material from flowing over the sides of the conveyor, and these walls are usually made a part of the conveyor or are moved along with the conveyor in the form of endless belts in order to prevent the side walls from dragging on the material as it moves. The feeding of the material to the conveyor generally requires the use of a hopper, or the like, since the material is usually mixed in batches but must be fed continuously at a uniform rate. Heretofore, the feeding operation has presented a difficulty when the materials are sticky or tacky, because such materials adhere to the sides and bottom of the hopper and clog or retard the flow to the conveyor, with the result that the feeding is not at a constant rate and the articles are therefore irregular in form.

One feature of the present invention, accordingly, resides in the provision of a novel apparatus of the character described including a feeding mechanism which operates smoothly and efficiently, even with materials which are sticky, so as to feed the material evenly at a constant rate to the conveyor. The feeding mechanism includes a hopper, or the like, in which the ingredients of the material may be mixed, or which may be arranged to receive the material from a suitable mixing vessel, and the hopper is adapted to discharge the material continuously through an opening of appropriate size and shape to the conveyor. I have found that the material may be prevented from clogging in the hopper or dragging against the walls thereof by allowing the material to move by gravity down through the hopper and providing moving elements or surfaces at the regions where the material contacts the hopper. These surfaces may be arranged to oscillate in the hopper or they may be moved continuously in the hopper in the direction of travel of the material. In either case, they assure a continuous passage of the material through the hopper without obstruction, so that the material is fed at a substantially constant rate to the conveyor.

Another feature of the invention resides in the provision in an apparatus of the type referred to, of novel means for smoothing the top surface of the material as it moves on the conveyor and, at the same time, making the ribbon of material of the desired thickness throughout. In feeding the material to the conveyor, the rate of feed generally varies a slight amount from time to time, even when the material flows unobstructed through the hopper, this variation being due to the change in the pressure of the column of material in the hopper when the latter is recharged and then gradually emptied. Such variation may result, in addition, when oscillating surfaces are employed in the hopper in accordance with the invention, due to the changes in pressure on the material when the surfaces contacting it reverse their direction of movement. As a result of this variation in the rate of feed, the thickness of the ribbon of material on the conveyor would be non-uniform, unless suitable provision were made to counteract the variation. The various devices employed heretofore for smoothing plastic materials, such as a shaver for trimming the top surface, or a roller or pressing plate, are unsatisfactory when the material is sticky, because the material adheres to or drags on the device so as to interfere with its operation, with the result that the top surface of the material is frequently roughened.

According to the present invention, a surface forming device is provided above the conveyor at a location beyond the region where the material is deposited from the hopper, and this device forms with the conveyor a nozzle or orifice through which the material is extruded at a controlled rate and a uniform thickness as the conveyor moves. I have found that by reciprocating or oscillating the forming device in a direction transverse to the movement of the material, the device operates in the desired manner even when the material is sticky, without interference due to adhesion of the material to the forming device. The device may have a straight edge contacting the upper surface of the material, whereby the surface of the material is made flat, or the contacting edge may be of any other desired form depending upon requirements. For example, if it is desired to provide a concave surface on the material, the surface forming device could be made in the form of a sector of a circlet and oscillated about its axis. In any case, by reciprocating or oscillating the forming device transversely, the material passing under the device is provided with a smooth top surface of the desired form, even though the material is sticky.

Still another feature of the invention resides in the provision of an apparatus for forming tiles and similar articles which includes a novel mechanism for automatically trimming and bevelling the edges of the articles. In machines of this type, the edges of the articles formed are frequently rough and irregular due to adhesion of the material to the sides of the conveyor or to the action of the device which cuts the ribbon of material into the desired lengths. Also, when the surface forming device of the invention is employed, there may be a tendency for the device to upset the side edges of the ribbon of material, resulting in irregular edges. It is desirable to trim these edges and, in some instances, form them with a bevel before the material hardens, but when the material is sticky or tacky, this has been practically impossible of successful attainment heretofore, because the material normally adheres to the trimming and bevelling devices.

In the new machine, according to the preferred form of my invention, the articles after being cut from the ribbon of material are acted upon by a trimming and bevelling mechanism which includes knives or blades, one for each side of the article, and means for pressing the plastic material at the corners formed by adjacent top and side surfaces to provide the desired bevel. The blades may be arranged so that only their cutting edges contact the finished surface of the article as they cut, or they may be arranged to scrape against the pressing means as they are withdrawn from the article, so that pieces of the material cannot adhere to the blades and become detached from the finished article. The cutting devices may be moved downwardly into the material either before or after the pressing means are actuated to press the corners, or at the same time, but preferably the mechanism includes a control means which operates the cutting and pressing devices in a sequence such that the cutters are withdrawn from the article before the pressing means. Thus, the withdrawal of the cutters cannot interfere with the pressing means and spoil the bevelled edges. Since the pressing means contacts only the corners of the article, there is no appreciable adhesion of material thereto.

These and other features of the invention may be better understood by reference to the following detailed description taken in conjunction with the accompanying drawings. In the drawings

Figure 1A:
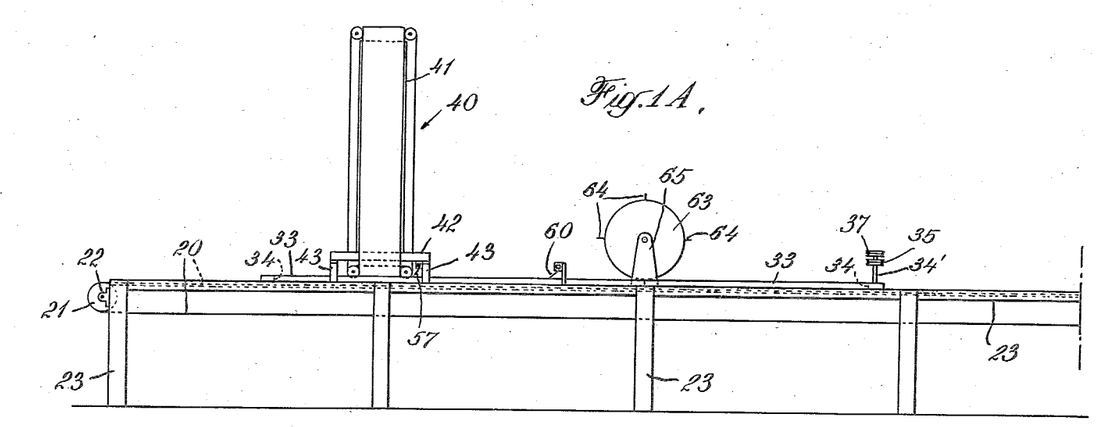
Fig. 1A is a diagrammatic side view of part of a machine made in accordance with the invention, showing the hopper and the conveyor.
Figure 2A:
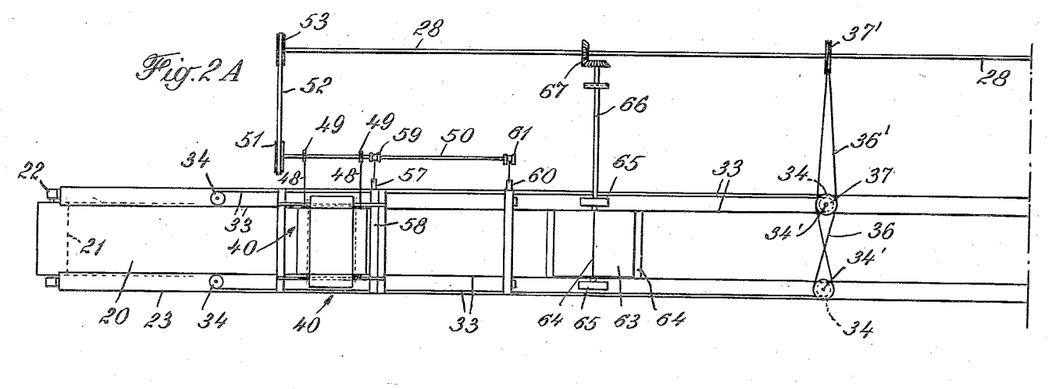
Figs. 2A and 2B are plan views of the parts of the machine shown in Figs. 1A and 1B respectively.

For illustrative purposes, I have shown a machine suitable for making tiles of square or rectangular form, although it will be understood as the description proceeds that the machine may be readily adapted to form articles of other shapes as well. The machine illustrated comprises a conveyor in the form of an endless belt 20 mounted on rollers 21 rotatable in bearings 22 on the machine frame 23. The belt is driven by an extension 25 on one of the rollers (Fig. 2B), the extension having a bevel gear 26 at the end thereof meshing with a bevel gear 27 on a drive shaft 28. The shaft 28 is adapted to be driven by a motor 29 through change speed gearing (not shown) housed in a casing 30. Preferably, the material used in making the tiles is deposited on plaques 32 (Figs. 3 and 4) of approximately the same lateral dimensions as the finished tile, and these plaques are fed successively in end to end relation to the conveyor 20 at the left end of the machine, as viewed in Figs. 1A and 2A, by any standard or other suitable feeding mechanism (not shown). The plaques are moved by the belt 20 beneath moving side walls 33 which may take various forms but are shown in the form of endless belts arranged on vertical rollers 34 mounted in bearings on the machine frame. One of the rollers 34 for each belt is provided with an extension 34' which carries a pulley 35 above the belt, and the two pulleys 35 are connected by a crossed belt 36 and driven through a belt 36' and a pulley 37 from a pulley 37' on the drive shaft 28. Preferably, the inner section of each belt 33 is backed by a section of a bracket 38 mounted on the frame 23, the belt being adapted to slide over the vertical face of the bracket so that it is retained against lateral displacement by the material on the conveyor.

Figures 3, 4:
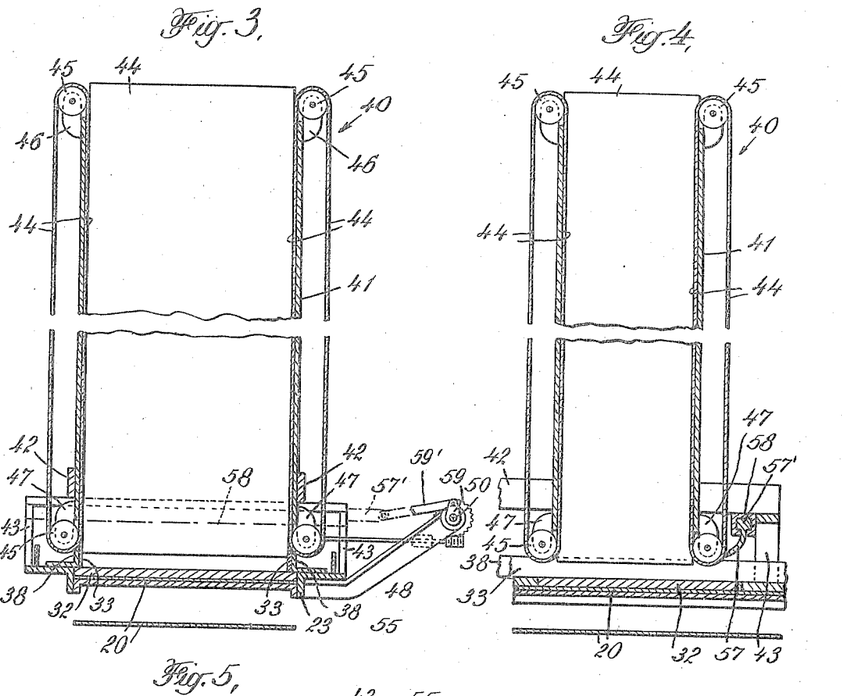
Fig. 3 is a vertical, transverse sectional view of the hopper shown generally in Figs. 1A and 2A.
Fig. 4 is a vertical, longitudinal sectional view of the hopper shown in Fig. 3.
Figure 5:
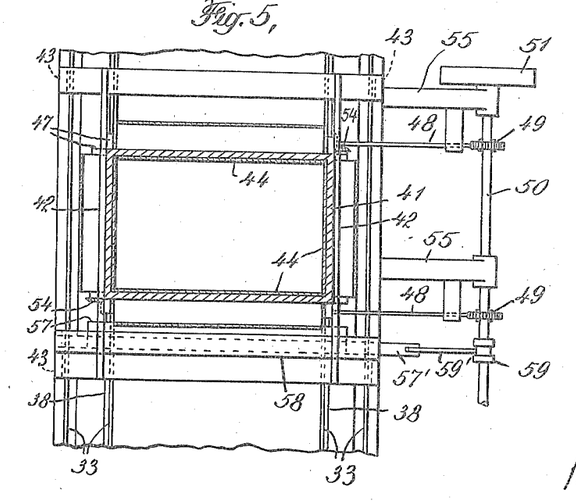
Fig. 5 is a horizontal sectional view of the hopper shown in Figs. 3 and 4.

The material is fed to the conveyor by a hopper 40 shown in detail in Figs. 3, 4, and 5. As there shown, the hopper is made up of side walls 41 and is open at the top and bottom, the width of the hopper being approximately the desired width of the finished tile. The hopper is mounted on the frame of the machine by bars 42 secured to opposite walls and mounted on supports 43 on the frame. An endless belt 44 extends over each wall of the hopper along the inner face thereof and under the bottom of the wall, and is supported on rollers 45 near the top and bottom of the hopper. The rollers 45 at the top are carried by arms 46 rigidly secured to the hopper in any suitable manner, while the rollers at the bottom are mounted on arms 47 projecting from the sides of the hopper. The two transverse rollers at the bottom of the hopper are formed with extensions 48 connected by a worm and wheel 49 to a countershaft 50, the latter being connected through a pulley 51, a belt 52 and a pulley 53 to the drive shaft 28. The remaining lower rollers 45 are driven from the transverse rollers by bevel gears 54, as shown in Fig. 5. The counter shaft 50 may be mounted in suitable bearings in brackets 55 secured to the machine frame.

The plastic material for making the tiles is preferably fed to the hopper 40 by gravity from a mixing vessel (not shown) located above the hopper. Generally, the ingredients are mixed in this vessel in batches and the material deposited in the hopper from time to time so as to maintain a substantial depth of material in the hopper. In tile making machines used heretofore, it has been found that when the material in its initial state is sticky or tacky, it tends to adhere to the surfaces which it contacts in the feeding device, so that the tiles are rough and irregular as a result of irregular feeding of the material to the conveyor due to clogging of the feeding device. I have found that this is particularly so when the plastic material is light and fluffy, as is the case with certain plastics now in common use. With the feeding apparatus described, even light, sticky materials of this character may be handled satisfactorily, I have found, and fed at a substantially constant rate, without clogging, to the conveyor. The endless belts 44 are driven at a proper speed to assure a continuous flow of material from the hopper to the conveyor at a rate correlated with the rate of travel of the latter, so that as the conveyor moves from under the hopper, it carries on it a continuous ribbon of material of substantially uniform thickness throughout.

It will be observed by reference to Fig. 3, that two of the rollers 45 near the bottom of the hopper are disposed adjacent the angle iron brackets 38 on the machine frame, so that the belts carried by these rollers scrape lightly on the edges of the brackets as the belts are driven. Consequently, any material adhering to these belts is scraped off by the brackets and caused to fall into the conveyor. Any material which is not scraped from the belts 44 is carried up to the top of the hopper and back into the interior thereof.

The ribbon of material carried on the conveyor from under the hopper may vary slightly in thickness from time to time due to changes in the pressure of the column of material in the hopper incident to charging and subsequent emptying of the hopper, or to other causes. In order to remove any irregularities in the ribbon resulting from such variations, I provide a novel surface forming device located above the conveyor beyond the region where the material is deposited thereon. This device may take various forms, but as shown in Figs. 3, 4 and 5 it comprises a blade or doctor's knife 57 extending transversely of the conveyor beyond the front wall of the hopper 40. An enlargement 57' at the upper end of the blade is fitted closely in a transverse guide 58 mounted on one of the supports 43 on the machine frame. At one end, the blade 57 is provided with an extension connected to a crank 59 through a link 59', the crank 59 being driven by the counter-shaft 50. As shown particularly in Fig. 4, the lower edge of the blade 57 is slightly rounded at the bottom where it contacts the material on the conveyor, and the blade extends obliquely upwardly from its cutting edge in the direction of travel of the material on the conveyor. With this construction, the only contact between the blade and the material is at the edge of the blade and the rounded surface leading upwardly from the edge, and because of the oscillation of the blade and the motion of the material passing under the blade, the material is prevented from adhering to this small surface. By mounting the blade 57 with its cutting edge substantially in contact with the front belt 44, as shown in Fig. 4, the blade serves to remove any material adhering to the belt as it passes out of the hopper.

In operation, the blade 57 is reciprocated rapidly by the crank 59 in a direction transverse to the movement of the material, and by employing such a reciprocating blade in the location described, the ribbon of material passing from beneath the hopper is maintained at a uniform thickness throughout as it moves through the orifice formed by the blade and the conveyor. Thus, the blade forms one edge of this orifice through which the material is in effect extruded as the conveyor carries it along, and this moving edge of the orifice controls the amount of material flowing through the orifice at all times, without in any way obstructing or clogging the flow due to adhesion of the material. If desired, a second surface forming device 60, similar to the device 57, may be mounted on the frame beyond the first device and driven by a crank 61 on the shaft 50. Preferably, the cutting edge of the device 60 is disposed slightly below the edge of the blade 57 so that any depressions in the ribbon of the material passing out from under the blade 57 will be removed as the ribbon passes under the blade of the device 60.

A cutter 63 is mounted on the machine frame beyond the surface forming devices 57 and 60 to cut the ribbon of material into the desired lengths. The cutter, as shown, is in the form of a drum carrying diametrically opposed blades 64 and is mounted for rotation on standards 65 on the frame. An extension 66 of the drum shaft is connected through bevel gears 67 to the main drive shaft 28. The drum is driven from shaft 28 at such a rate that one of the blades 64 is moved down between each pair of adjacent plaques as the latter are moved by the conveyor, the blade acting to cut the material and separate the plaques.

Figure 1B:
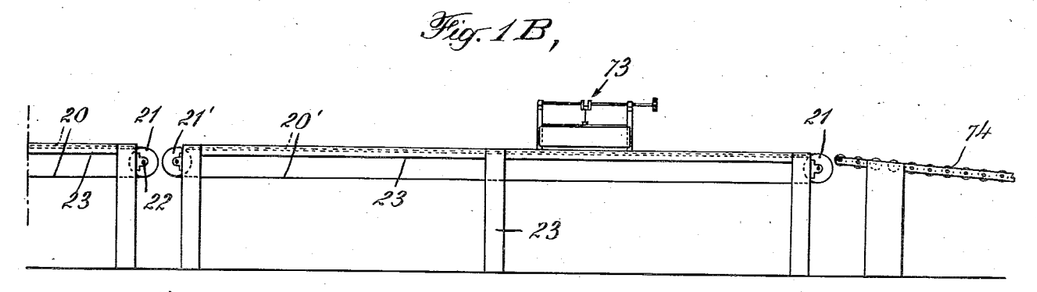
Fig. 1B is a similar view and a continuation of Fig. 1A, showing another part of the machine for trimming and bevelling the articles.
Figure 2B:
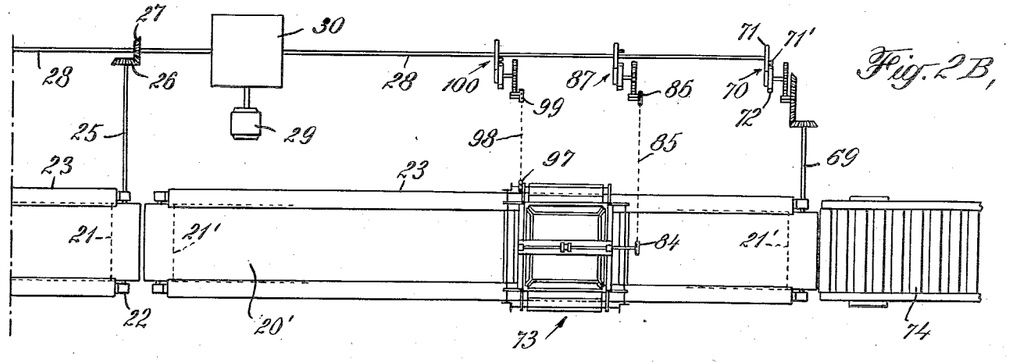

The plaques 32 bearing the severed lengths of tiles are moved on the belt 20 to a similar endless belt 20', as shown in Figs. 1B and 2B. The belt 20' is carried by rollers 21' rotatable in suitable bearings on the machine frame 23, and one of the rollers 21' is formed with an extension 69 which is rotated with a step by step movement from the drive shaft 28 through a Geneva mechanism 70. The Geneva mechanism is of standard construction including a wheel 71 mounted on the end of shaft 28 and having a projecting stud 71' adapted to engage a cog-wheel 72, once for each revolution of shaft 28. The wheel 72 is thus rotated with a step by step movement and drives the roller 21' and the belt 20' through suitable gearing. The plaques are picked up one by one from belt 20 by the belt 20' and carried along with a step by step movement to a trimming and bevelling mechanism 73, shown generally in Figs. 1B and 2B, where the sides of each tile, which may have been upset by the surface forming devices 57 and 60, are trimmed. The plaques with the finished tiles thereon are then moved along the conveyor to a set of rollers 74 which carries the tiles to a suitable drying chamber.

Figure 6:
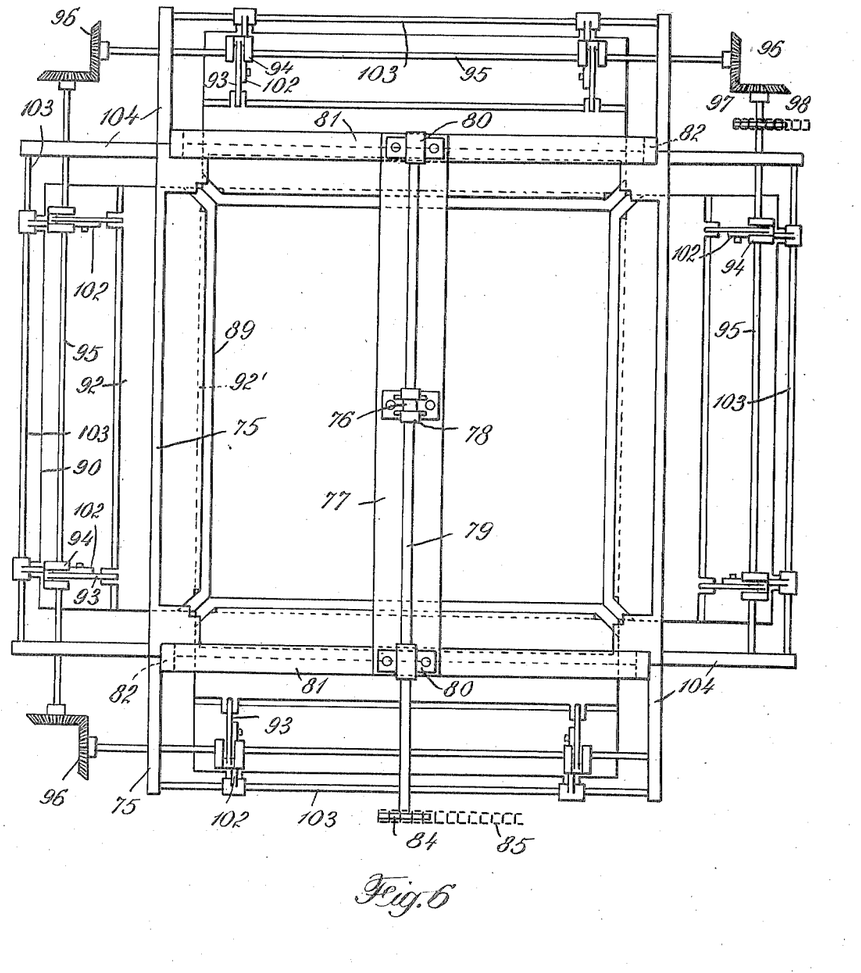
Fig. 6 is a plan view of the trimming and bevelling mechanism shown generally in Figs. 1B and 2B.

The trimming and bevelling mechanism 73 is shown in detail in Figs. 6 to 9, inclusive. As there shown, the mechanism includes a four sided, double walled frame 75 which is adapted to be reciprocated vertically in a direction normal to the surface of the tiles T by means of a link 76 connected at one end to a cross bar 77 on the frame and at the opposite end to a crank 78 mounted on a shaft 79. The shaft is rotatable in bearings 80 mounted on supporting members 81 over the opposite ends of the frame, the members 81 being supported on standards 82 secured to the machine frame and forming vertical guides for the frame, as shown in Fig. 6. At one end, the shaft 79 projects through one of the bearings 80 and has secured thereto a toothed wheel 84 which is driven by a chain 85 from a sprocket wheel 86 (Fig. 2B). The wheel 86 is adapted to be driven with a step by step movement from the drive shaft 28 through another Geneva mechanism 87. Thus, the frame 75 is alternately lowered as the belt 20' comes to a stop in its step by step movement, and then raised after a predetermined time interval during which the belt remains stationary.

Figure 7:
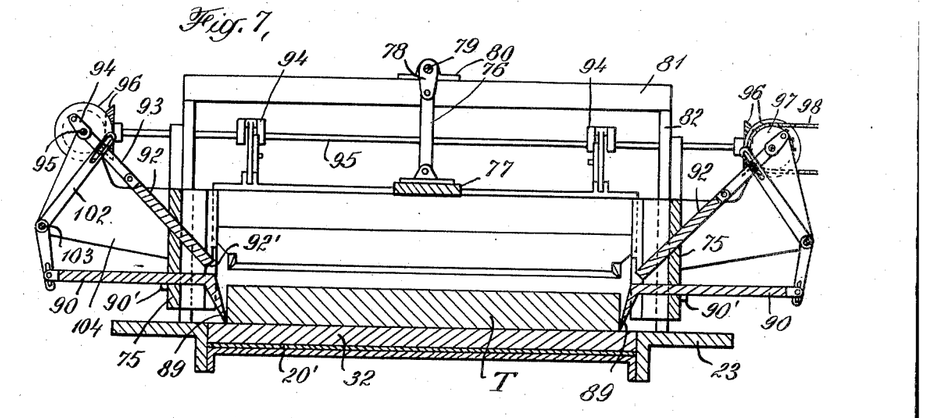
Fig. 7 is a vertical, transverse sectional view of the mechanism shown in Fig. 6, showing the mechanism in one position.
Figure 8:
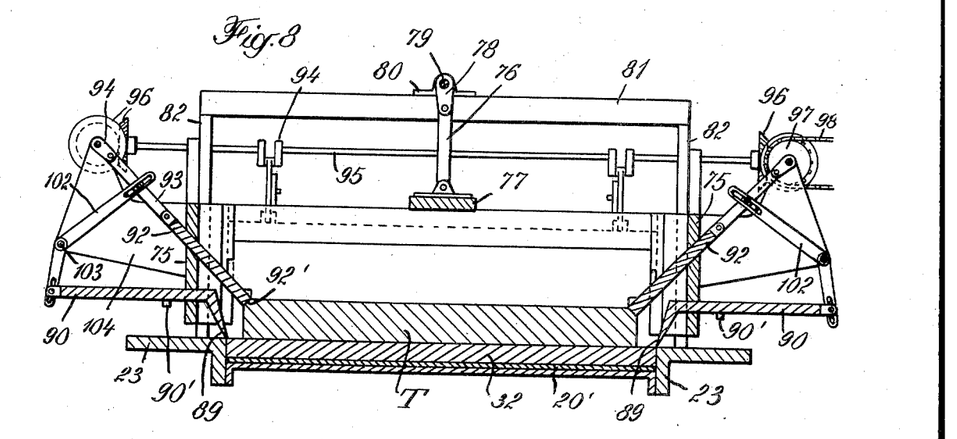
Fig. 8 is a somewhat similar view showing the mechanism in another position.

Mounted in the frame 75 are four knives or blades 89, one in each side of the frame, the blades extending upwardly and outwardly from their respective cutting edges, as shown in Figs. 7 and 8, so that only the edges of the blades contact the finished surfaces of the tile as the blades are moved down through the tile. Each blade 89 is provided with a lateral extension 90 movable laterally in the frame, the lateral movement of the blade toward the tile being limited by a stop 90' adapted to engage the adjacent wall of the frame. Mounted in each side of the frame above the blades 89 is a bevelling device 92 disposed at an oblique angle and movable edgewise into and out of contact with the adjacent corner of the tile formed by adjacent top and side surfaces thereof. The bevelling devices 92 are provided at their leading edges with narrow, inclined surfaces 92' adapted to press these corners of the tile and form the desired bevels.

Each of the bevelling devices 92 is connected at its upper end by a pair of links 93 to cranks 94 carried by a shaft 95 which is mounted for rotation in the frame 75. The several shafts 95 are connected together by bevel gears 96 and are driven by a sprocket wheel 97 mounted on one of the shafts and connected by a chain 98 (Fig. 2B) to a sprocket wheel 99, the latter being driven from shaft 28 through a third Geneva mechanism 100.

The Geneva mechanism 100 is adjusted with respect to the Geneva mechanism 87 so that the shafts 95 are rotated to move the bevelling devices 92 down into engagement with the corners of the tile after the frame 75 has been moved to its lower position. Normally, the blades 89 are in their innermost positions in the frame, as shown in Fig. 7, so that when the frame is lowered the blades are moved down through the tile to trim the side edges thereof. Thereafter, when the shafts 95 are rotated, the bevelling devices 92 are moved to press the corners of the tile, and during this movement the blades are retracted laterally from the tile by bell crank levers 102 pivoted on shafts 103 held in extensions 104 of the frame, one arm of each lever being connected to one of the links 93 and the other arm to the outer end of the adjacent blade extension 90. Thus, the blades are automatically withdrawn from the tile by movement of the bevelling devices, so that the blades cannot interfere with the operation of these devices and spoil the bevelled corners of the tile. When the bevelling devices 92 have completed the pressing operation as shown in Fig. 8, the frame is moved back to its upper position by the Geneva mechanism 87, and then the Geneva mechanism 100 operates again to rotate shafts 95 and retract the bevelling devices in the frame and advance the blades laterally until the stops 90' engage the walls of the frame. The mechanism is now ready for operation on the next tile carried thereunder by the belt 20'.

Figure 9:
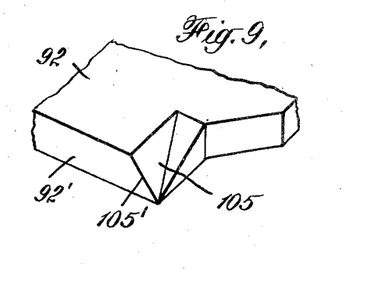
Fig. 9 is a detail view showing part of the bevelling means.
Figure 9A:
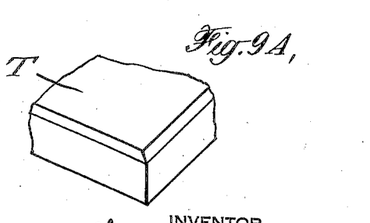
Fig. 9A is a perspective view of one corner of a finished tile.

It will be observed by reference to Fig. 6 that the blades 89, when in their innermost positions in the frame, contact each other at their adjacent ends so that when the frame is lowered the tile is trimmed along each side over the entire length thereof. Also, the bevelling devices 92 are formed so that when they are moved together to contact the corners of the tile, adjacent ends of the devices meet, whereby the corners are pressed and bevelled along their entire lengths. Preferably, the adjacent corners of the bevelling devices 92, where they meet, are cut away to form angular surfaces 105, as shown in Fig. 9, each terminating in an edge 105' which is adapted to contact in parallel relation the corresponding edge of the adjacent bevelling device when the devices are moved together. Each pair of edges 105, when they meet, acts to pinch off or extrude the excess material at the corners of the tile, so that the bevelled edges of adjacent sides of the tile meet in a common oblique line, as shown in Fig. 9A.

Since the blades 89 of the trimming mechanism engage the finished surfaces of the tile only at the cutting edges of the blades, there is no substantial adhesion of the material to the blades when the latter are withdrawn. Also, since the bevelling devices contact the tiles over only a narrow area at the corners thereof, there is no substantial adhesion of the material to these devices.

From the foregoing, it will be apparent that the operations of the conveyor 20, the hopper 40, the surface forming devices 57 and 60, the cutting mechanism 63, and the trimming and bevelling mechanism 73 are maintained in step at all times, because these mechanisms are driven from a common power source, the motor 29. Thus, the operating speed of the machine may be varied at will by simply adjusting the change speed gears in the housing 30. The plastic material in its movement through the machine contacts only moving surfaces or edges of small area, and accordingly "dragging" of the material on the parts of the machine is substantially eliminated. The plaques may be provided on top with sheets of paper, or the like, on which the plastic material is deposited from the hopper, to prevent adhesion of the material to the plaques, and these sheets may be removed from the tiles after they have hardened.

Figure 10:
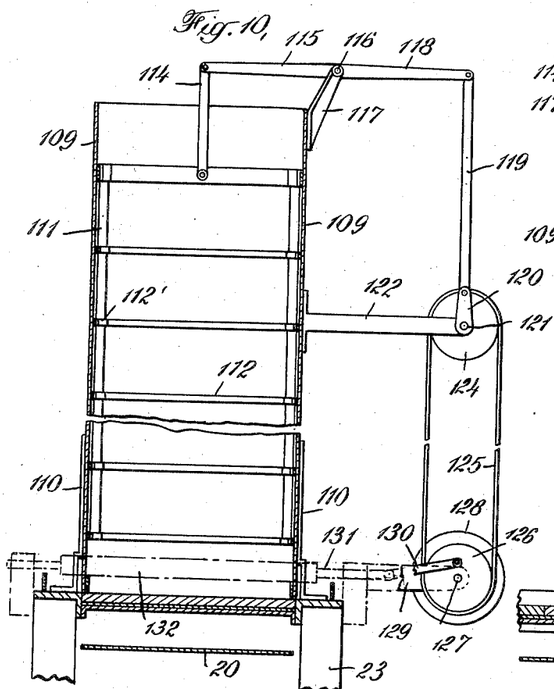
Figs. 10 and 11 are vertical sectional views of a modified form of the hopper.
Figure 11:
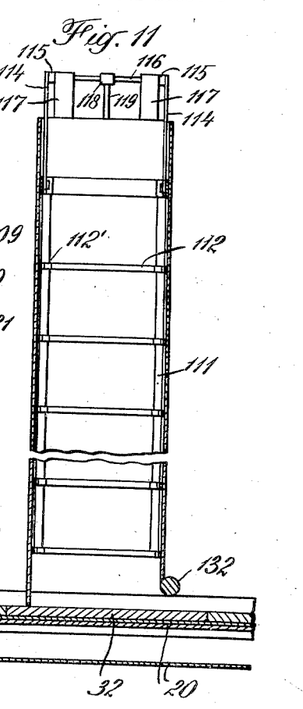
Figure 12:
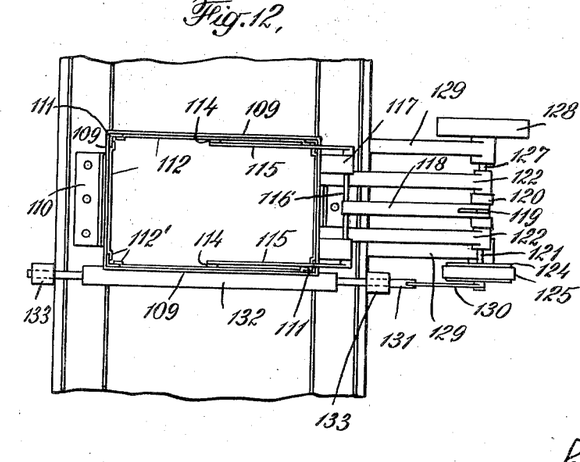
Fig. 12 is a plan view of the hopper shown in Figs. 10 and 11.

In the hopper shown in Figs. 3, 4, and 5, the surfaces contacting the material are moved continuously in the direction of flow of the material through the hopper. If desired, however, the hopper may be provided with reciprocating surfaces contacting the material, and I have shown such a hopper in Figs. 10, 11 and 12. The hopper there shown is open at the top and bottom and comprises a frame having opposed side walls 109, the frame being supported on brackets 110 secured to the machine frame 23. Mounted within the frame 109 is a cage comprising vertical angle iron bars 111 disposed at the corners of the frame and to which horizontal bars 112 are secured in any desired manner, as by welding. The bars 112 are formed at their ends with offset portions 112' engaging the faces of the bars 111, and the bodies of the bars 112 lie in substantially contacting relation with the inner surfaces of the hopper walls, as shown in Fig. 12.

The cage 111, 112 is reciprocated in the hopper by a pair of links 114 pivoted at their lower ends to the top of the cage at opposite sides thereof, and at their upper ends to arms 115 secured rigidly to a shaft 116 which is rotatable in brackets 117 secured to one wall of the hopper. The shaft 116 is adapted to be oscillated by an arm 118 extending outwardly therefrom and pivotally connected to a link 119 which, in turn, is connected at its lower end to a crank 120. The crank is mounted on a shaft 121 rotatable in brackets 122 secured to the hopper and has a pulley 124 secured to one end thereof. A belt 125 drives the pulley 124 from a similar pulley 126 on a shaft 127 which is driven by a pulley 128 from a power source (not shown) and is rotatably mounted in brackets 129 on the machine frame. A crank arm 130 connected eccentrically to pulley 126 is pivoted to an extension 131 of an elongated member 132, such as a dowel, extending transversely of the conveyor 20, and the crank arm is adapted to reciprocate the member 132 endwise in bearings 133 on the machine frame. The member 132, as shown in Fig. 11, is disposed near the bottom of the hopper beyond the region where the material is deposited on the plaques 32 and forms with the conveyor an orifice through which the material is extruded as it moves along the conveyor. It operates in a manner similar to the blade 57 (Fig. 4) to smooth the top surface of the material and remove any irregularities due to oscillation of the cage 111, 112 or any other cause.

The cage is oscillated in the hopper 109 with an amplitude such that the bars 112 move over the entire inner surface of the hopper during the oscillation. I have found that by providing a cage in the hopper and oscillating it in this manner, the material is prevented from adhering to the walls of the hopper and clogging the flow through the hopper. Since the bars 111 and 112 are quite thin, they offer but little resistance when they are moved through the material, and any slight variation in the pressure on the material incident to the cage reversing its direction of motion is counter-acted by the reciprocating member 132 at the outlet end of the hopper.

Figure 16:
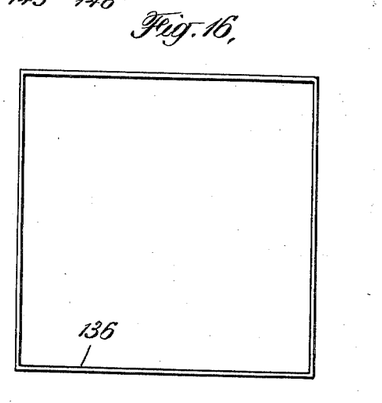

A modified form of the trimming and bevelling mechanism is shown in Figs. 13 to 16, inclusive. As there shown, the mechanism comprises a cutter 136 having vertical side walls provided at the bottom with cutting edges flush with the inner surfaces of the walls. The cutter may be of any desired shape depending on the desired shape of the finished tile, but for illustrative purposes I have shown a square cutter, a detailed view of which is shown in Fig. 16. A yoke 137 is connected to the cutter and provided with a stud 138 to which one arm of a lever 139 is pivoted by a pin and slot connection. The lever 139 is adapted to rock on a standard 140 on the machine frame 23, and its other arm is pivoted through a pin and slot connection to a crank wheel 142. The wheel 142 is rotatably mounted on an arm 143 of standard 140 and may be driven by any suitable means (not shown).

Fitted closely in the cutter 136 is a plunger 145 provided around its periphery with bevelled, leading surfaces 146. The main body of the plunger is offset from the peripheral portion thereof, as shown at 145', so that when the plunger is moved down into contact with tile T the only parts of the plunger engaging the tile are the bevelled surfaces 146 and the portions immediately adjacent thereto. A yoke 147 secured to the offset portion 145' of the plunger is provided with a stud 148 pivoted through a pin and slot connection to one arm of a lever 149 adapted to rock on a standard 150. The other arm of lever 149 is pivoted through a pin and slot connection to a crank wheel 152 which is rotatably mounted on an arm 153 of standard 150. The wheel 152 is preferably driven by the same power source (not shown) which drives the wheel 142, so that the cutter and plunger are raised and lowered in a predetermined sequence.

Figure 13:
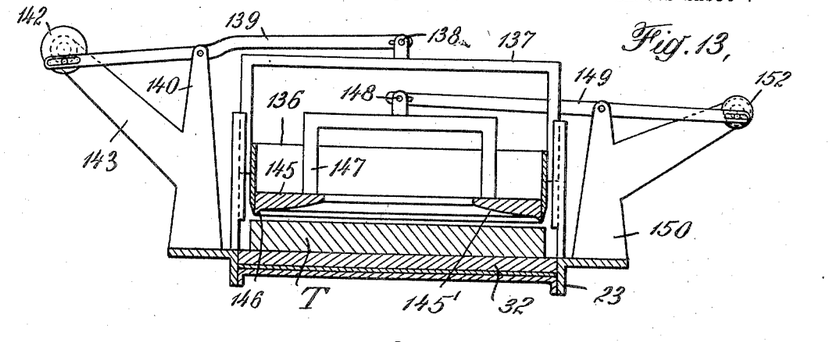
Fig. 13 is a vertical sectional view of a modified form of the cutting and trimming mechanism.
Figure 14:
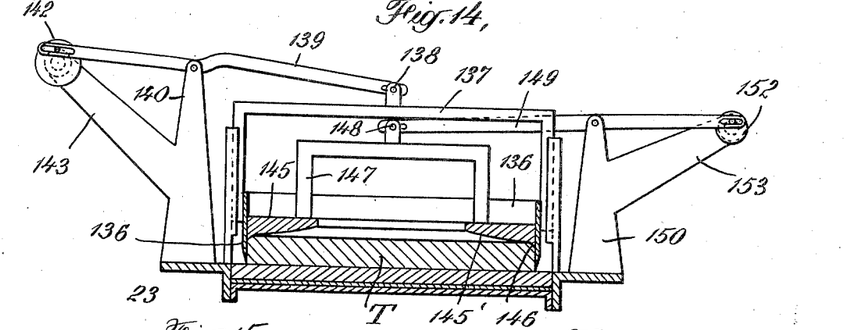
Fig. 14 is a similar view showing the mechanism in a different position.
Figure 15:
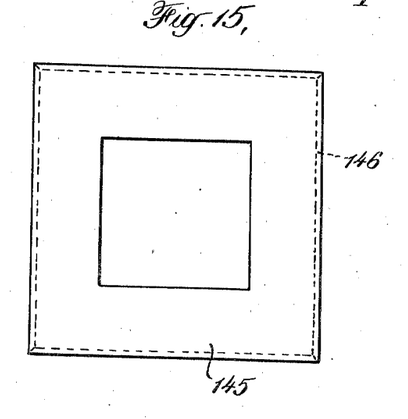
Figs. 15 and 16 are plan views of parts of the mechanism shown in Figs. 13 and 14.

In operation, the plunger and cutter are normally retracted in elevated positions, as shown in Fig. 13. When a tile is moved on its plaque 32 to a position under the mechanism, the plunger is preferably moved first into engagement with the top surface of the tile by the crank 152, so as to embed the bevelling portions 146 into the tile. In this position of the plunger, the upper peripheral edges thereof are still within the confines of the cutter. The crank 142 then moves the cutter downwardly into the tile to trim the side edges thereof, and then the cutter is withdrawn from the tile while the plunger is still held in its depressed position. Thus, as the cutter moves back to its elevated position, any material adhering to the inner surfaces of the cutter walls is scraped off by the edges of the plunger which contact these walls. The material thus removed from the cutter tends to displace material under the bevelled surfaces 146 of the plunger, and the resulting shifting of the material under the surfaces 146 tends to prevent any adhesion of the material to the plunger when the latter is raised from the tile following withdrawal of the cutter.

I claim:

1. In an apparatus of the character described, the combination of a conveyor, a hopper positioned above the conveyor for receiving material to be deposited thereon and including movable elements at the sides thereof normally contacting material in the hopper, means for moving said elements to maintain a free flow of material from the hopper to the conveyor, a surface forming device for counteracting variations in the rate of feed from the hopper, said device being positioned above the conveyor beyond the region where the material is deposited thereon and forming with the conveyor an orifice through which material on the conveyor is extruded, means for reciprocating said device transversely to the direction of movement of the material on the conveyor to maintain a free flow through said orifice, a device for cutting the material on the conveyor into articles of desired length, and a trimming and bevelling mechanism for finishing irregular side surfaces formed by said forming and cutting devices and comprising cutting and pressing means, the cutting means being movable in a direction generally normal to the upper surface of the article to trim the sides thereof, the pressing means having inclined surfaces adapted to engage the corners of the article formed by adjacent top and side surfaces thereof, and means for actuating said cutting and pressing means in a predetermined sequence to remove the pressing means from the article only after withdrawal of the cutting means therefrom.

2. In a machine of the character described for making tiles and similar articles, a trimming and bevelling mechanism for finishing the articles comprising cutting and pressing means, the cutting means being movable in a direction generally normal to the upper surface of the article to trim the sides thereof, the pressing means having inclined surfaces adapted to engage corners of the article formed by adjacent top and side surfaces, and means for actuating said cutting and pressing means in a predetermined sequence to remove the pressing means from the article only after withdrawal of the cutting means therefrom.

3. In a machine of the character described for making tiles and similar articles, a trimming and bevelling mechanism for finishing the articles comprising cutting and pressing means, the cutting means being movable in a direction generally normal to the upper surface of the article to trim the sides thereof, the pressing means having inclined surfaces adapted to engage corners of the article formed by adjacent top and side surfaces, a frame for supporting said means in cooperative relation and with reference to which said means are movable, and mechanism for moving said means relative to the frame in a predetermined sequence whereby the pressing means is removed from the article only after withdrawal of the cutting means therefrom.

4. In a machine of the character described for making tiles and similar articles, a trimming mechanism for finishing the articles comprising a plurality of blades, means for moving the blades downwardly through the article to trim the sides thereof, each blade extending obliquely upwardly from its cutting edge and outwardly from the article whereby it contacts the finished side surface of the article only at said cutting edge, and means for moving the blades outwardly from the article on completion of the cutting strokes.

5. In a machine of the character described for making tiles and similar articles, a trimming mechanism for finishing the articles comprising a frame movable in a direction generally normal to the upper surface of the article, a plurality of relatively movable blades mounted in the frame, means for moving the frame downwardly to pass the blades through the article to trim the sides thereof, each blade extending obliquely upwardly from its cutting edge and outwardly from the article whereby it contacts the finished side surface of the article only at said cutting edge, and means for moving the blades outwardly in the frame and away from the article on completion of the cutting strokes thereof.

6. In a machine of the character described for making tiles and similar articles, a bevelling mechanism for finishing the articles comprising a frame movable in a direction generally normal to the upper surface of the article, a plurality of relatively movable pressing elements mounted in the frame, each element having an inclined surface adapted to engage one corner of the article formed by adjacent top and side surfaces thereof, means for moving the frame to bring said elements in position to engage said corners, and means for thereafter reciprocating said elements in the frame to move the inclined surfaces thereof into and out of engagement with said corners.

7. In a machine of the character described for making tiles and similar articles, a trimming and bevelling mechanism for finishing the article comprising a frame movable in a direction generally normal to the upper surface of the article, a plurality of relatively movable blades mounted in the frame, a plurality of relatively movable pressing elements mounted in the frame adjacent the blades, each pressing element having an inclined surface adapted to engage one corner of the article formed by adjacent top and side surfaces thereof, means for moving the frame to pass the blades through the article and to move said elements in position to engage said corners, means for moving the blades outwardly in the frame and away from the article on completion of their cutting strokes, and means for thereafter reciprocating said elements in the frame to move the inclined surfaces of the elements into and out of engagement with said corners.

8. In a machine of the character described for making tiles and similar articles, a bevelling mechanism for finishing the article comprising a plurality of relatively movable, obliquely disposed pressing elements each having an inclined surface adapted to engage the article at one corner formed by adjacent top and side surfaces, the elements being movable together into engagement with said corners to bevel the same, adjacent corners of said elements being cut away to form an angular surface on each element terminating in a sharp edge adapted to engage in parallel relation the corresponding edge of the adjacent element when said elements are moved together, whereby said edges of adjacent elements extrude the excess material of the article at the corners thereof.

9. In an apparatus of the character described, the combination of a conveyor having a bottom and side walls movable in unison, means for feeding a plastic material on the conveyor, a straight-edged surface-forming device positioned above the conveyor with its lower surface substantially flush with the top edges of said side walls and adapted to contact material moving along the conveyor, means for securing said device against vertical movement relative to the conveyor, said device overlapping the side walls of the conveyor and forming with the conveyor an orifice through which material on the conveyor is extruded, and means for reciprocating said device horizontally and transversely to the direction of movement of the conveyor while maintaining the ends of the device in overlapping relation to the side walls of the conveyor, thereby to maintain a free extrusion of material through said orifice at a substantially constant rate.

10. In an apparatus of the character described, the combination of a conveyor having a bottom and side walls movable in unison, means for feeding a plastic material to the conveyor, a substantially straight bar positioned above the conveyor and extending transversely to the direction of movement of the conveyor, the bar having its lower surface substantially flush with the top edges of said side walls and being adapted to contact material which moves along the conveyor, the bar overlapping the side walls of the conveyor so as to form with the conveyor an orifice through which material on the conveyor is extruded, means for securing the bar against vertical movement relative to the conveyor, and means for reciprocating the bar endwise while maintaining the ends of the bar in overlapping relation to the side walls of the conveyor, thereby to provide a substantially uniform extrusion of material through said orifice.

11. In an apparatus of the character described, the combination of a conveyor having a bottom and side walls movable in unison, means for feeding a plastic material to the conveyor, a substantially straight-edged knife blade positioned above the conveyor and extending transversely to the direction of movement of the conveyor with its edge substantially flush with the top edges of said side walls, the blade being adapted to contact material which moves along the conveyor and overlapping the side walls of the conveyor so as to form with the conveyor an orifice through which material on the conveyor is extruded, means for securing the blade against vertical movement relative to the conveyor, and means for reciprocating the blade endwise while maintaining the ends of the blades in overlapping relation to the side walls of the conveyor, thereby to provide a substantially uniform extrusion of material through said orifice.

12. In an apparatus of the character described, the combination of a conveyor having a bottom and side walls movable in unison, means for feeding a plastic material to the conveyor, a substantially straight-edged knife blade positioned above the conveyor and extending transversely to the direction of movement of the conveyor with its edge substantially flush with the top edges of said side walls, the blade being adapted to contact material which moves along the conveyor and overlapping the side walls of the conveyor so as to form with the conveyor an orifice through which material on the conveyor is extruded, the blade extending obliquely upwardly from the material in the direction of travel thereof and having a gradually rounded lower surface extending from the edge thereof generally parallel to the upper surface of the material, means for securing the blade against vertical movement relative to the conveyor, and means for reciprocating the blade endwise while maintaining the ends of the blade in overlapping relation to the side walls of the conveyor, thereby to provide a substantially uniform extrusion of material through said orifice.

CHARLES B. CAPERTON.